(12) United States Patent
Wang et al.

(10) Patent No.: US 11,157,438 B2
(45) Date of Patent: *Oct. 26, 2021

(54) METHOD OF PERFORMING AUTOMATIC COMMISSIONING OF A NETWORK

(71) Applicant: SIGNIFY HOLDING B.V., Eindhoven (NL)

(72) Inventors: Xiangyu Wang, Eindhoven (NL); Armand Michel Marie Lelkens, Heerlen (NL); Maurice Herman Johan Draaijer, Ittervoort (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 146 days.

This patent is subject to a terminal disclaimer.

(21) Appl. No.: 16/450,458

(22) Filed: Jun. 24, 2019

(65) Prior Publication Data

US 2019/0310962 A1  Oct. 10, 2019

Related U.S. Application Data

(62) Division of application No. 13/880,071, filed as application No. PCT/IB2011/054534 on Oct. 13, 2011, now Pat. No. 10,366,048.

(30) Foreign Application Priority Data

Oct. 22, 2010  (EP) .................................. 10188455

(51) Int. Cl.
    *G06F 15/177*  (2006.01)
    *H04L 12/28*  (2006.01)
    (Continued)

(52) U.S. Cl.
    CPC ........ *G06F 15/177* (2013.01); *H04L 12/2809* (2013.01); *H05B 47/18* (2020.01); *H04L 41/12* (2013.01); *H04L 2012/285* (2013.01)

(58) Field of Classification Search
    CPC .................................................. H04L 41/0618
    See application file for complete search history.

(56) References Cited

U.S. PATENT DOCUMENTS

| 6,601,097 | B1 | 7/2003 | Cheston |
| 2002/0038360 | A1 | 3/2002 | Andrews |

(Continued)

FOREIGN PATENT DOCUMENTS

| CN | 101622910 A | 1/2010 |
| EP | 1560379 A1 | 8/2005 |

(Continued)

OTHER PUBLICATIONS

Wondernetwork (wondernetwork.com/pings/New%20York captured on Jul. 9, 2020) (Year: 2020).*

(Continued)

*Primary Examiner* — Nicholas P Celani
(74) *Attorney, Agent, or Firm* — Daniel J. Piotrowski

(57) ABSTRACT

The invention describes a method of performing automatic commissioning of a network (N) comprising a plurality of network devices (10, 11, 12, 13), wherein each device (10, 11, 12, 13) is characterised by a device identifier (14) and wherein the devices (10, 11, 12, 13) are realised to exchange data packets (2), which method comprises the steps of obtaining a computer-readable installation plan (3) for the network (N), which installation plan (3) comprises a physical location descriptor (31) for devices (10, 11, 12, 13) of the network (N); deducing the network topology (T) of the network (N) from network descriptive information (40, 41, 42, 43) provided by the devices (10, 11, 12, 13) on the basis of data packets (2) exchanged between the devices (10, 11, 12, 13); and comparing the deduced network topology (T) to the installation plan (3) to allocate a physical location descriptor (31) to a device identifier (11). The invention further describes a commissioning system (1) for automati- (Continued)

cally commissioning a network (N) comprising a plurality of network devices (10, 11, 12, 13), wherein each device (10, 11, 12, 13) is characterised by a device identifier (14) and wherein each device (10, 11, 12, 13) is realised to transmit and receive data packets (2), which commissioning system (5) comprises a source (50) of a computer-readable installation plan (3) for the network (N), which installation plan (3) comprises a physical location descriptor (31) for each device (10, 11, 12, 13) of the network (N); a device control interface (55) realised to collect network descriptive information (40, 41, 42, 43) provided by the devices (10, 11, 12, 13); a topology discovery unit (53) realised to derive the network topology (T) of the network (N) from the provided network descriptive information (40, 41, 42, 43); and a commissioning unit (54) realised to compare the derived network topology (T) to the installation plan (3) to allocate a physical location descriptor (31) to a device identifier (14).

19 Claims, 7 Drawing Sheets

(51) Int. Cl.
*H05B 47/18* (2020.01)
*H04L 12/24* (2006.01)

(56) References Cited

U.S. PATENT DOCUMENTS

| | | |
|---|---|---|
| 2003/0033427 A1 | 2/2003 | Brahmaroutu |
| 2003/0216143 A1 | 11/2003 | Roese |
| 2003/0235155 A1 | 12/2003 | Boivie |
| 2004/0109417 A1 | 6/2004 | Castro |
| 2004/0210671 A1 | 10/2004 | Beadle |
| 2005/0246358 A1 | 7/2005 | Barus et al. |
| 2005/0226167 A1 | 10/2005 | Braun |
| 2006/0274673 A1 | 12/2006 | Fleury |
| 2006/0282529 A1 | 12/2006 | Nordin |
| 2007/0189184 A1 | 8/2007 | Ryu |
| 2008/0010367 A1 | 1/2008 | Chen |
| 2008/0049627 A1 | 2/2008 | Nordin |
| 2008/0155094 A1 | 6/2008 | Roese |
| 2008/0186871 A1 | 8/2008 | Trevino |
| 2009/0210932 A1 | 8/2009 | Balakrishnan |
| 2009/0238079 A1 | 9/2009 | Gantenbein |
| 2009/0278479 A1 | 11/2009 | Platner |
| 2009/0304381 A1 | 12/2009 | Muppidi |
| 2010/0106774 A1 | 4/2010 | Thomson |
| 2010/0142544 A1 | 6/2010 | Chapel |
| 2010/0202298 A1* | 8/2010 | Agarwal ............... H04L 41/147 370/252 |
| 2011/0282988 A1* | 11/2011 | Wang .................... H04L 41/12 709/224 |
| 2019/0007503 A1* | 1/2019 | Zmijewski .......... H04L 43/0823 |

FOREIGN PATENT DOCUMENTS

| | | |
|---|---|---|
| WO | 0247331 A2 | 6/2002 |
| WO | 03056758 A1 | 7/2003 |
| WO | 2006095317 A1 | 9/2006 |
| WO | 2006136985 A1 | 12/2006 |
| WO | 2008029326 A2 | 3/2008 |
| WO | 2009069118 A2 | 6/2009 |
| WO | 2009104121 A2 | 8/2009 |

OTHER PUBLICATIONS

Ping (Wikipedia, Jul. 28, 2010).
Traceroute (Wikipedia, Jun. 11, 2010).
Uzair, Umer et al, "An Efficient Algorithm for Ethernet Topology Discovery in Large Multi-Subnet Networks", Proc. IEEE 2007.

* cited by examiner

METHOD OF PERFORMING AUTOMATIC COMMISSIONING OF A NETWORK

CROSS-REFERENCE TO PRIOR APPLICATIONS

This application is a Divisional Application of U.S. Ser. No. 13/880,071 filed on Apr. 18, 2013 which claims the priority benefit under 35 U.S.C. 371 of International Patent Application No. PCT/IB2011/054534, filed on Oct. 13, 2011, which claims the priority benefit of European Application 10188455.9, filed on Oct. 22, 2010, the contents of which are herein incorporated by reference.

FIELD OF THE INVENTION

The invention describes a method of performing automatic commissioning of a network, and a commissioning system for automatic commissioning of a network.

BACKGROUND OF THE INVENTION

Many commercial, public or industrial buildings with many levels and many rooms avail of a control system for controlling the lighting, ventilation, air-conditioning etc. Devices such as lights or luminaires, light switches, light sensors, thermostats etc. with networking capability can be installed as part of a device network that can be centrally and automatically controlled. In a typical building such as a large office complex or a hospital, the device network may comprise many hundreds or even thousands of devices or nodes. Devices may be wireless and can communicate using a suitable wireless protocol. In a wired network such as an Ethernet network, neighbouring devices are physically wired together using a suitable connector such as a twisted pair or a co-axial cable. A 'branch' of a network refers to a number of devices wired together in series.

To set up such a wired network, the devices are first wired together according to a predefined plan. For example, a certain group of luminaires, for example all the luminaires in one room, can be wired together with a light sensor in a daisy-chain configuration. Each luminaire and sensor can be realised as simple bridges, i.e. with only two ports. One luminaire of the group of luminaires can in turn be wired to a 'switch' or hub located, for example, in a corridor outside that room, whereby the term 'switch' should not be confused with a 'light switch' or other manual switch, but is used in the context of a multi-port bridge. The hub in turn can be wired to other hubs or bridges. The order in which the devices are to be connected is usually specified on a plan generated using a program such as AutoCAD, which an electrician can consult while carrying out the wiring. The wired network then comprises a plurality of nodes (the devices) connected by branches (the connecting wires), whereby the nodes can be sent and receive messages (data packets) along the branches of the network.

Usually, the luminaires, sensors etc. of the network are controlled by some suitable control system running on a server, whereby the devices can be individually or collectively controlled by the control system. An example of a prior art dedicated lighting control system operates on a standard such as a digital addressable lighting interface (DALI) for the control of lights. In order to be able to correctly control the devices according to the wishes of the building's occupants or management, the control system must be informed as to which device is located at which physical location in the building. For example, in order to be able to switch on or off the lights in a particular room on a particular level, the control system must known which lights are located in that room. Giving the control system this information is referred to as 'commissioning', which is performed after the electrical installation of power cables and data cables has been completed. Unfortunately, the known methods of performing commissioning involve much manual input, and are time-consuming, labour-intensive and error-prone. In fact, the commissioning of a prior art lighting control system such as a DALI system can constitute up to one third of the total cost of the system.

Therefore, it is an object of the invention to provide a more reliable and cost-effective way of commissioning a network.

SUMMARY OF THE INVENTION

This object is achieved by a method according to claim 1 of performing automatic commissioning of a network, and by the commissioning system according to claim 10.

According to the invention, the method of performing automatic commissioning of a network comprising a plurality of network devices, wherein each device is characterised by a device identifier and wherein the devices are realised to exchange data packets, which method comprises the steps of obtaining a computer-readable installation plan for the network, which installation plan comprises a physical location descriptor for each device of the network, deducing the network topology of the network from network descriptive information provided by the devices, and comparing the deduced network topology to the installation plan to allocate a physical location descriptor to a device identifier.

In the context of network devices, the ability to 'exchange data packets' means that a device of the network can send or broadcast a data packet, and can receive a data packet. A sent data packet can be sent to a specific device or can be broadcast to all devices in a position to receive it. The device identifier of a device can be any suitable means of identifying the device of the network, for example a code that is unique to that device and which can be included in any data packet broadcast or sent by that device to mark that device as the originator of the data packet. Similarly, the device identifier of a target device can be included in a data packet as the 'address' of that target device. The computer-readable installation plan can be in any suitable machine-readable format and can have been generated from any suitable computer-aided drafting program, for example AutoCAD. A physical location descriptor for a device can be any suitable tag or code such as an alphanumeric sequence giving the physical location of that device, for example an alphanumeric sequence giving the building level, the room number and the position in that room for that device. The advantage of the method according to the invention is that the network descriptive information provided by the devices can be analysed entirely automatically to deduce or discover the network topology, and, together with the installation plan, the physical location descriptor of each device can easily and quickly be identified. In this way, each device of the network can be matched to its unique physical location descriptor. In other words, using the method according to the invention, commissioning can be carried out entirely automatically without any labour-intensive and expensive manual input. This information in turn can be used, for example by a system controller, to control specific devices of the network according to the requirements of the user(s).

According to the invention, the commissioning system for automatically commissioning a network comprising a plurality of network devices, wherein each device is characterised by a device identifier and wherein each device is realised to transmit and receive data packets, which commissioning system comprises a memory for storing a computer-readable installation plan for the network, which installation plan comprises a physical location descriptor for each device of the network; a device database for storing a device identifier for each device of the network; a data input unit for inputting network descriptive information provided by the devices; a topology discovery unit for deriving the network topology of the network from the provided network descriptive information; and a commissioning unit for comparing the derived network topology to the installation plan to allocate a physical location descriptor to a device identifier.

Since the commissioning system according to the invention is not limited to use with any particular network standard or device control interface standard, the inventive commissioning system can advantageously use the capabilities of a commercial off-the-shelf (COTS) computer networking technology to commission the network.

The dependent claims and the following description disclose particularly advantageous embodiments and features of the invention. Features of the embodiments may be combined as appropriate to arrive at further embodiments.

While each device can both send and receive data packets, in the following and for the sake of convenience, a device that has received a data packet may be referred to as a 'receiving device', while a device that has sent or broadcast a data packet may be referred to as a 'sending device'. Data packets can be sent or received by such a device over a network interface card (NIC) built into the device. A data packet, command or message is usually assembled or compiled by a sending device in a predefined frame structure, so that a receiving device can detect the beginning and end of a frame and can extract specific information fields from the frame.

Preferably, the device control interface of the commissioning system is realised to control devices of a wired network. For example, the devices are preferably wired together in an Ethernet TCP/IP network.

Devices of a network such as a frame-based local area network can usually both send and receive data packets or frames. Therefore, in a preferred embodiment of the invention the network descriptive information is accumulated by devices of the network on the basis of data packets sent and received by those devices.

Since the devices in a network are usually identified uniquely at least in that network by their device identifier, in a preferred embodiment of the invention the network descriptive information accumulated by a receiving device comprises a list of device identifiers, wherein each device identifier entered into the list indicates a device that broadcast a data packet received by the receiving device. In this way, each receiving device can compile or assemble a list of device identifiers from which it has received one or more data packets. In effect, such a list specifies the devices to which the receiving device can also forward data packets, and may be referred to as a 'forwarding table'. The device identifier can be any suitable code, uniquely identifying that device at least in that network, such as a 128-bit Internet protocol address (IP address) or a 48-bit media access control address (MAC address). As will be known to the skilled person, such an address can be permanently stored in the firmware of the device, or on its network interface card, in a read-only memory of the device, etc.

A device of the network may be a router or bridge with two ports, so that the device is capable of sending and receiving data packets at each port. Of course, devices of the network can also be multi-port bridges or hubs, capable of routing a data packet over a specific port. For such a router or switch, each port is also uniquely identified by its port identifier or port number. Therefore, in a particularly preferred embodiment of the invention, the network descriptive information accumulated by a receiving device comprises a list of port identifiers, wherein each port identifier of the compiled list indicates the port from which a sending device broadcast the data packet received by that receiving device. In other words, for each port number of a receiving device, the receiving device lists the device identifier of the device that sent a message received at that port, as well as the port number of the port from which the sending device sent the message. This list or table can be referred to as a 'connectivity table'. A device that is capable of accumulating and using such information is referred to as a 'learning bridge'.

A device of the network may possess only IP-router capability. In a further preferred embodiment of the invention, therefore, the network descriptive information accumulated by a device comprises information that can be used to deduce the distances of other IP routers in relation to that device. For example, in order to collect network descriptive information about other IP routers connected to a device, that device can broadcast a suitable message to a particular target device, and track the time it takes for the message to be returned from that target device. The time taken for the message to pass from one IP router to another on its way to the target device is also preferably tracked. For example, a device can issue a 'traceroute' message command, specifying a particular device identifier as target. The message is forwarded by each IP router until it reaches its target device. Each device along a path enters its timestamp into the message body. When the target device is reached, it also enters its timestamp and returns the traceroute command back to the originating device, which then extracts the timestamp information. If the target device is not reached, a timeout occurs and this information is also returned to the originator. The network descriptive information can then comprise an 'elapsed time' for each IP router reached by the message. For example, if the traceroute command to a target device is returned to the originator after successful delivery and after passing through two other intermediates device, the time taken for the message to reach the target device will be longer than the time taken for it to reach the intermediate devices. Equally, the time taken for the message to reach the second intermediate device will be longer than the time taken for it to reach the first intermediate devices. From the network descriptive information collected by the originating device, it may therefore be concluded that the target device is further away from the originator than the intermediate devices, and that the second intermediate device is further away from the originator than the first intermediate device. For example, measurements or calibrations in prior observations may provide information about the time taken for a data packet to be routed from one device to another along a wired connection of an Ethernet network. The forwarding delay time of a data packet might typically comprise about 0.1 milliseconds, i.e. a packet might take 0.1 milliseconds to pass from one device to the next. Using this information, together with the compiled traceroute lists provided by the devices of the network, the topology discovery unit can make reasoned estimates of the physical distances between devices in the network and can use these to deduce the network topology.

A device of the network need not necessarily have routing capability. Instead, a device may simply be equipped with a single port for receiving and sending messages or data packets. Such a device may still be identified by a unique address in that network, for example an IP address. A message returned by that device can include its IP address, thus identifying that device as having received and returned the message. In a further preferred embodiment of the invention, therefore, the network descriptive information accumulated by a device comprises an elapsed time between an instant or timestamp at which a data packet was broadcast by a router (any bridge, switch or hub of the network) to a target device and an instant at which the data packet—returned by the IP-addressable target device—was received by the originating device. For example, a router can issue a ping message command from one of its ports, and can then collect the returned message and extract any IP-address and timestamp information from the returned message. In this way, a switch or hub can easily accumulate or collect network descriptive information from the IP-addressable devices connected to one of its ports. By analysing the network descriptive information collected by the originating device, the distances of the IP-addressable devices relative to the originating device may be deduced in the network discovery step.

The data packet to be sent by a sending device for the purpose of collecting network descriptive information is preferably assembled according to the capabilities of the receiving device(s). In a particularly preferred embodiment of the invention, for devices with message routing capability, a data packet broadcast by a sending device comprises a port number of a port of that sending device from which the data packet was broadcast and/or a device identifier of that sending device.

In a network realised to communicate using a suitable local area network protocol such as Ethernet TCP/IP, it may be possible to exchange messages between specific devices. Therefore, in a particularly preferred embodiment of the invention, a data packet is received and consumed by only one receiving device. Such a data packet can comprise a Bridging Protocol Data Unit (BPDU) in a network based on the IEEE MAC bridges standard (IEEE 802.1D) standard. A BPDU is sent from one router to the next router, and contains—amongst others—the device identifier of the sending device as well as the port number of the sending device from which the BPDU is sent. A BPDU message is sent from one device and 'consumed' by the immediately neighbouring device, i.e. the device connected to the port of the sending device from which the BPDU message was sent receives the message but does not forward it. Since a BPDU message contains the device ID of the sending device as well as the port identifier identifying the port from which the message was sent, the receiving device can easily compile a table with an entry for each of its own port identifiers, whereby each entry is then augmented with the device ID and port identifier of its immediate neighbours. In an Ethernet network, each device can have as many immediate neighbours as it has ports. For example, a router having two ports can have at most two immediate neighbours. Therefore, the network descriptive information collected by a router in such a network preferably comprises a connectivity table with the port number and device ID of the immediate neighbour on each port.

The network descriptive information collected by devices of the network—whether bridges, IP-routers or IP-addressable devices—can directly or indirectly deliver information about which devices are wired together. Therefore, in a preferred embodiment of the invention, the step of deducing the network topology comprises analysing the network descriptive information provided by the devices to identify neighbour devices for each device of the network. For example, one or more suitable algorithms can process the connectivity tables and/or forwarding tables and/or traceroute results and/or ping results etc. to deduce the network topology. Such algorithms may run on a processor of a programmable commissioning system. The choice of algorithm may depend on the capabilities of the devices of the network and the quality of the accumulated network descriptive information. Certain properties of the network can assist in determining the topology. For example, the root bridge can relatively easily be identified, since its connectivity table or forwarding table will include all device identifiers of the devices of the network. Similarly, multi-port bridges can also quickly be identified, since these will generally have lists of device identifiers for each of their ports. In contrast, a connectivity table or forwarding table of a daisy chain terminating device will only have a list of device identifiers for one of its ports. Once the network topology has been discovered, this can be compared to the installation plan in order to deduce which device identifier (and therefore which device) is associated with a particular physical location descriptor.

To initiate the exchange of data packets with a view to collecting network descriptive information, the commissioning system according to the invention preferably comprises a device control interface for controlling the devices of the network to broadcast data packets. The device control interface can be the same interface used to ultimately control the devices of the network according to a user's wishes. This device control interface can issue the appropriate number of commands at a suitable time, for example once the wiring has been complete, causing the devices—according to their capability—to exchange data packets such as BPDU messages, traceroute messages, etc. The device control interface can also control the devices to provide their accumulated or compiled network descriptive information (forwarding tables, connectivity tables, traceroute time results, ping time results, etc.) to the commissioning system.

Since the network may comprise devices with varying degrees of capability, for example the network may comprise some older devices as well as more advanced devices, the device control interface is preferably realised to control a device that comprises a router and/or to control a device that does not comprise a router. In this way, learning bridges can be controlled as well as more primitive devices, for example devices that are only IP-addressable but without any learning capability.

Since there are differences in capabilities between routers, for example one type of router might be a learning bridge, able to compile a forwarding table, or even a more advanced connectivity table, while another type of router may only be able to forward messages, the device control interface of the commissioning system according to the invention is realised to control a device comprising a bridge router and/or to control a device comprising an internet protocol router.

The commissioning system, once it has collected all the network descriptive information, analysed this to discover the network topology, and compared the deduced network topology to the installation plan to determine the physical location descriptor of each device identifier, preferably makes this known to a control system of the network, so that specific devices of the network can be controlled according to a user's wishes. Therefore, the commissioning system according to the invention preferably comprises a suitable interface for supplying a device identifier and the physical location descriptor of the associated device to a control system. For example, the commissioning system can compile a database with a list of device identifiers, wherein each device identifier is paired with a physical location descriptor. The list may be organised in various ways, for example the physical locations of each of the luminaires in one particular room may be grouped together in the list (since it is usual to activate such a group of luminaires collectively) with their associated device identifiers. A lighting control system, for example, can use the information provided to activate or control the lights accordingly. Of course, a network may also comprise standalone bridges or routers that are not inside any device that is specifically controlled by the control system. For example, a lighting control system may only address devices that are directly related to the lighting, for example luminaires and switches for controlling the luminaires. Other routers in the network may be controlled by other control systems, for example a heating control system may be provided with a list of physical location descriptors and device identifiers of the thermostats of a building. An access control system might be given a list of physical location descriptors and device identifiers of transponders or fingerprint readers controlling the doors of a building, etc.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the diagrams, like numbers refer to like objects throughout. Elements of the diagrams are not necessarily drawn to scale.

DETAILED DESCRIPTION OF THE EMBODIMENTS

Figure 1:
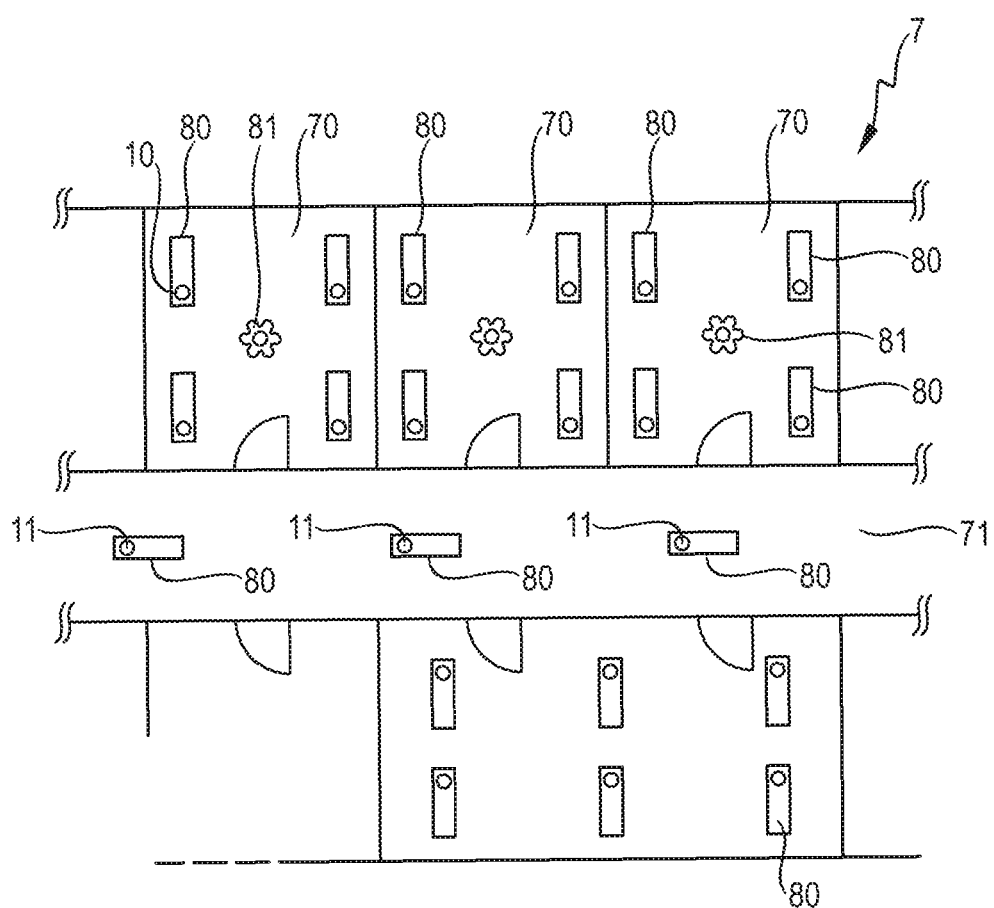
FIG. 1 shows a schematic representation of a floor plan of a building.

FIG. 1 shows a schematic representation of a floor plan 7 of a building with rooms 70 arranged along a corridor 71. Each room 70 contains a number of lights 80 and a light sensor 81, for example for sensing light levels with the room 70. Further lights are arranged in the corridor 71. The luminaires 80 and light sensors 81 are controllable by a lighting control system for the building. To this end, each luminaire 80 and sensor 81 incorporates a router, which can be a simple two-port bridge 10 or a multi-port bridge 11 or switch 11, as appropriate. For example, a luminaire 80 in a room 70 can incorporate a simple two-port bridge 10, while a luminaire in the corridor 71 can incorporate a switch 11 for passing commands in more than two directions. Each bridge 10, 11 can be realised to control the power supply to its luminaire 80 or sensor 81, so that the luminaires 80 and sensors 81 of the building can be individually and/or collectively controlled by the lighting control system.

Figure 2:
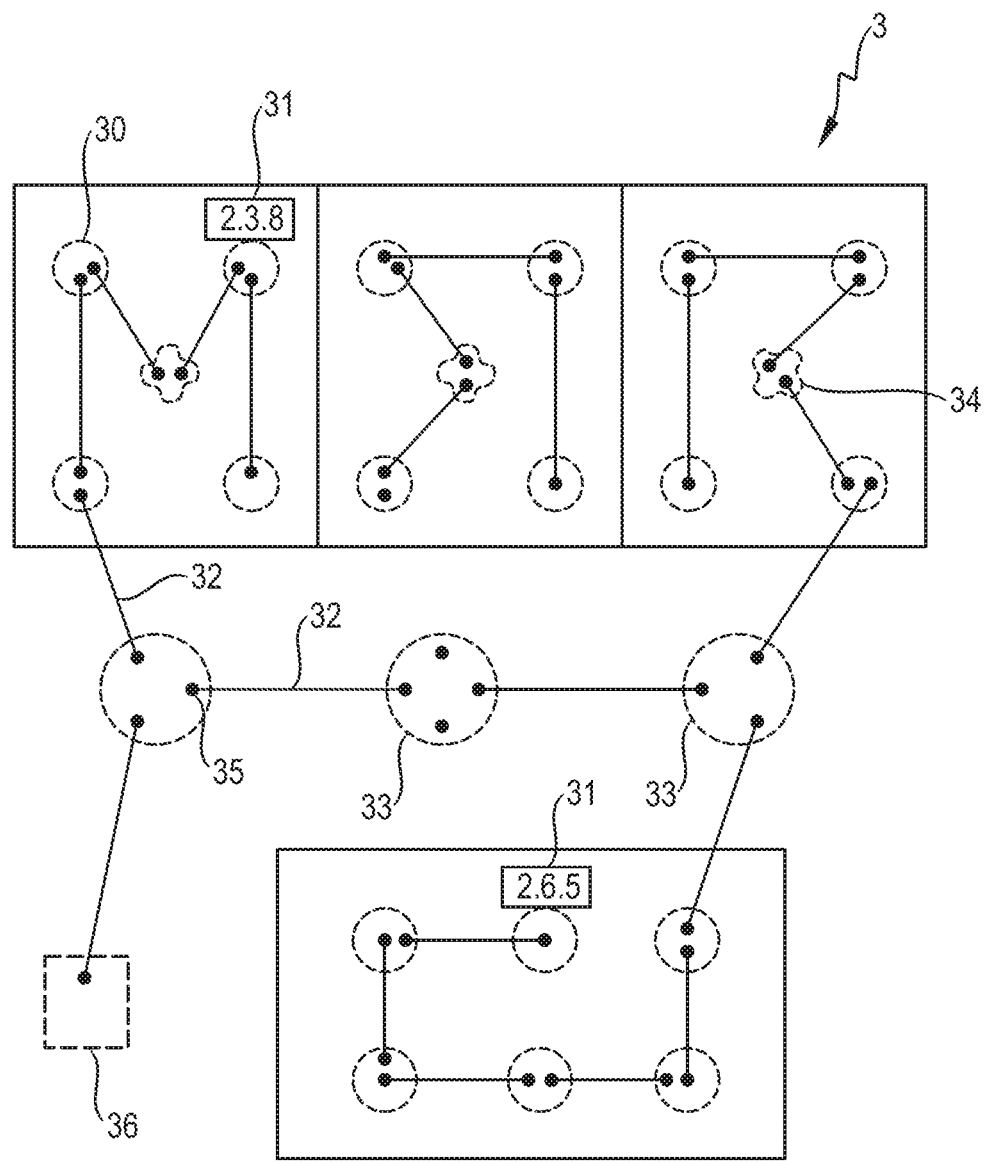
FIG. 2 is a schematic representation of a machine-readable installation plan.

The bridges 10, 11 are wired together in an Ethernet network according to an installation plan 3, shown in FIG. 2. The installation plan 3 indicates wired connections 32 to be made between certain pairs of fittings, whereby a fitting can be luminaire or a sensor in this example. Fittings are indicated by appropriate symbols 30, 33, 34 such as a luminaire symbol 30, 33 and a sensor symbol 34. Each wired connection is terminated at a port of a router, as indicated by the port symbol 35. A root bridge can be indicated on the installation plan 3 by an appropriate symbol 36. Each fitting is identified by a physical location descriptor 31, which in this case comprises a code consisting of a number for each floor, room and fitting. For example, the luminaire in the third room of the second floor, on the right and furthest away from the door, can be indicated by a physical location descriptor 31 comprising the ASCII character sequence "2.3.8". Of course, this is only a simple example, and for the sake of simplicity only a few such physical location descriptors are shown in the diagram. According to the plan 3, the bridges 10 of each room 70 are wired in a daisy-chain manner, and one of the bridges 10 of each room is wired to a switch 11 in the corridor 71. The switches 11 in the corridor 71 are also wired in a daisy-chain manner. In this way, all the devices that are to be controlled can be wired together to give a network, whereby the root bridge will be connected to the lighting control system. When wiring is complete, the network is powered up and enters the network topology discovery stage.

Figure 3:
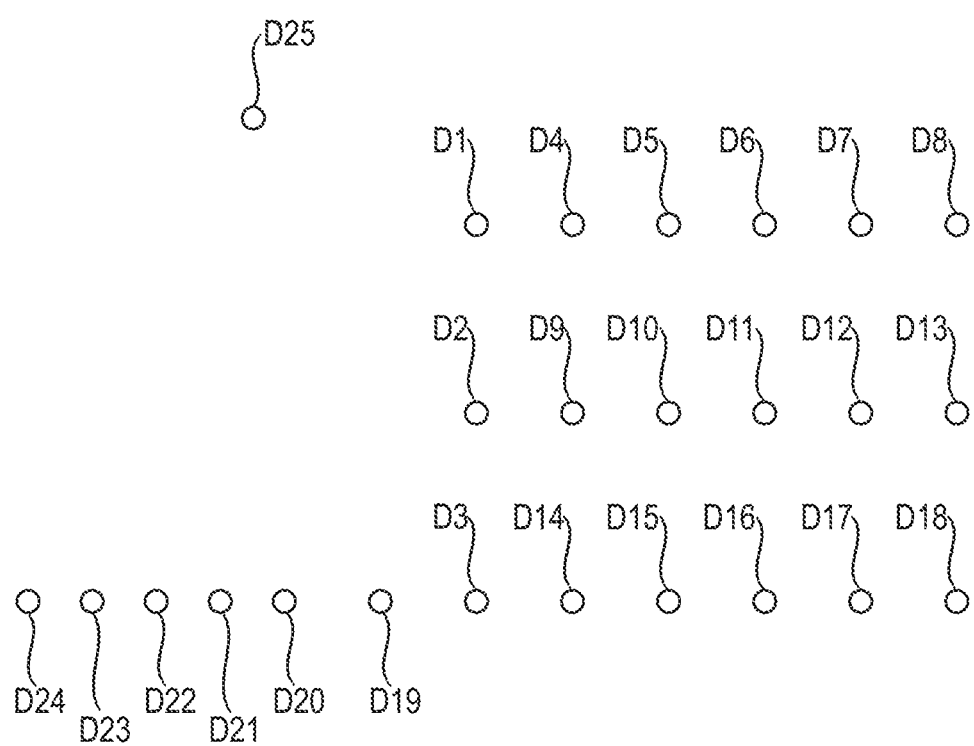
FIG. 3 is a schematic representation of devices of a network before network discovery.

Initially, the commissioning system has no information about the individual wired connections between the nodes or devices of the network, as indicated in FIG. 3, which gives a schematic representation of some devices D1, . . . , D25 of a network N before network discovery has been performed.

Figure 4:
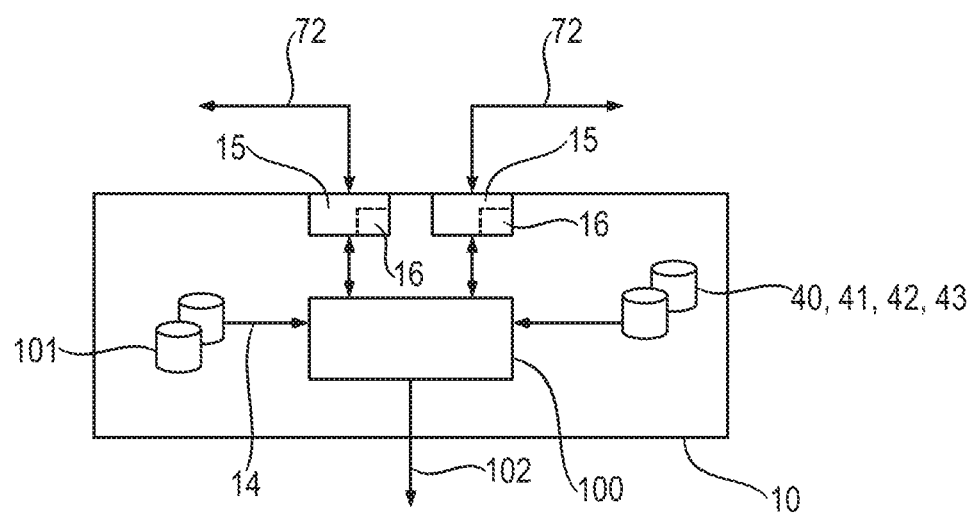
FIG. 4 is a block diagram of a bridge router.

FIG. 4 shows a simplified block diagram of a bridge router 10 with two ports 15. The bridge 10 is identified uniquely in that network by its bridge identifier 14, which can be stored in a memory 101, for example a memory of a network interface card. Similarly, each port 15 of the bridge 10 is indentified by its own port identifier. A message can be received from or sent to a neighbouring device along a wired connection 72. A processing unit 100 of the bridge 10 is realised to analyse a received message and to assemble a message to be sent. The processing unit 100 can also control the fitting in which it is incorporated according to the content of a received message, for example to connect or disconnect the fitting from a power supply (not shown) by means of a suitable signal 102. The bridge 10 can collect network descriptive information 40, 41, 42, 43 about its connectivity to other devices on the basis of information extracted from received messages. The nature of the collected network descriptive information 40, 41, 42, 43 can depend on the realisation or capability of the bridge. For example, a learning bridge 10 can compile a connectivity table 40 and/or a forwarding table 41. A learning bridge or an IP-router can assemble a traceroute list 42. The bridge 10 can also compile a ping table giving the round-trip times for ping messages sent from that device 10 to other devices in the network. To determine how the devices are wired together, a device control interface issues appropriate commands that are propagated through the system, beginning at the root bridge. Each bridge can receive a message and can send a message. For example, in a preferred approach, the device control interface can cause the devices to exchange BPDU messages with destination address 01:80:C2:00:00:00, which is a multicast address for bridge management. This message is received by a neighbouring device, which records on which port the message arrived. The receiving device waits for a predetermined time and then issues a BPDU message from each of its ports. In time, each device of the network will have issued and received BPDU messages, and will have compiled device identifier and port identifier information from each of its neighbours. Of course, the other described techniques can also be applied, in which the device control interface causes the devices to compile forwarding tables, or to issue traceroute or ping messages.

Figure 5:
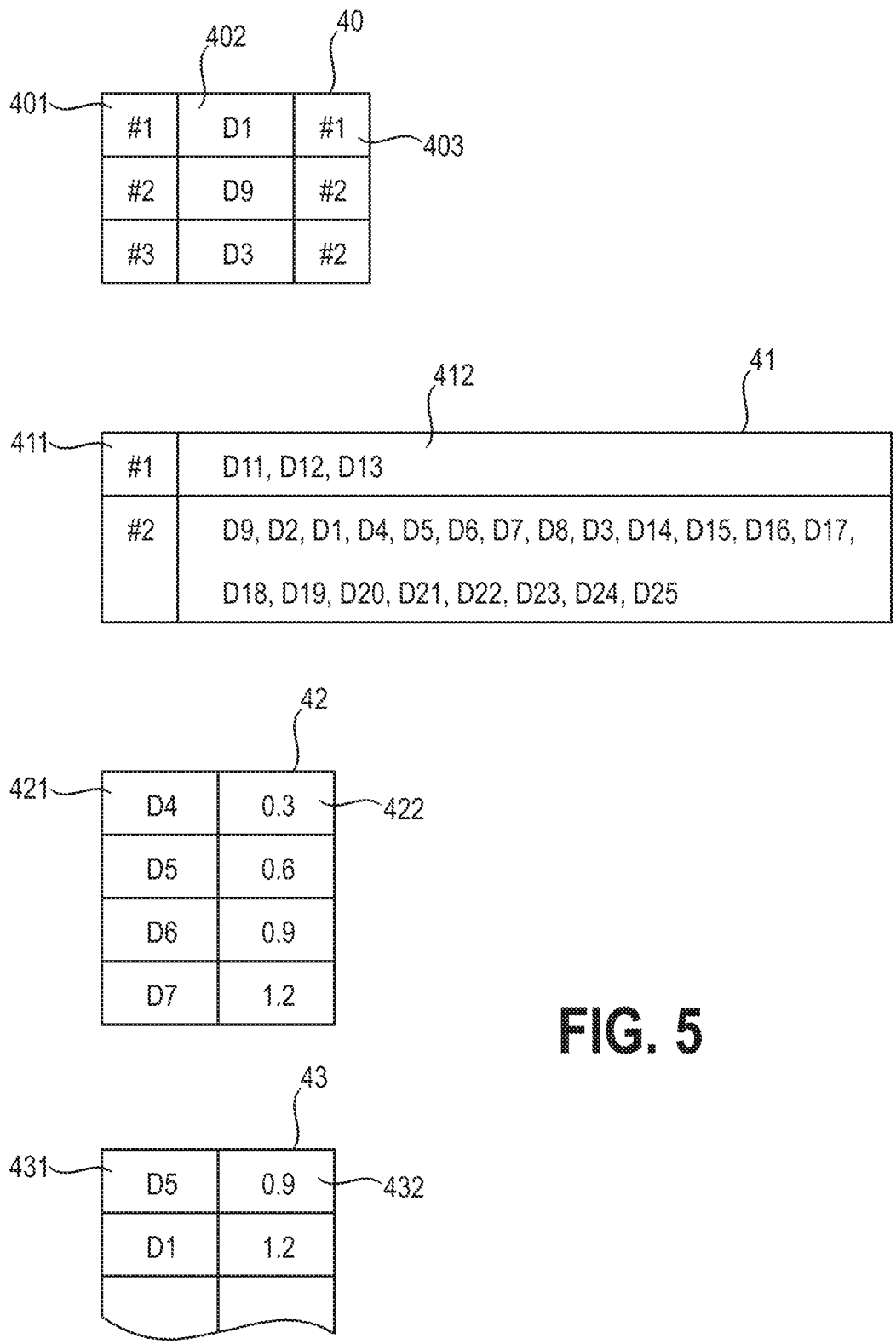
FIG. 5 is a schematic representation of network descriptive information accumulated by devices of the network of FIG. 3.

FIG. 5 is a schematic representation of network descriptive information 40, 41, 42, 43 accumulated by devices of the network of FIG. 3. For example, the device D2 has compiled a connectivity table 40. Each row of the connectivity table 40 has a field 401 for a port identifier of the device D2, a field 402 for the neighbouring device identifier 402, and a field 403 for the port identifier of the corresponding port of the neighbouring device. For the sake of simplicity, here and in the following, the device identifier is indicated by the device reference number used in the diagram, whereas in reality a device identifier would comprise an IP address or a MAC address. In this example, port #1 of device D2 is wired to port #1 of device D1; port #2 of device D2 is wired to port #2 of device D9; and port #3 of device D2 is wired to port #2 of device D3. From this connectivity table 40, the network topology discovery unit can conclude that device D2 must be a multi-port bridge with neighbouring devices D1, D9, D3.

Device D10 has compiled a forwarding table 41. Each row of the forwarding table 41 has an entry 411 for a port identifier of a port of the device D10, and an entry 412 for a list of device identifiers that have sent messages received on that port. In this example, on its port #2, device D10 has received messages from devices D11, D12, D13. On its port #1, device D10 has received messages from devices D9, D1-D3, D4-D9, D11-D25. From this connectivity table 40, the network topology discovery unit can conclude that device D10 must be a two-port bridge, and that only three devices are located beyond the first port of the two-port bridge D10.

Device D1 has compiled a traceroute table 42. Each row of the traceroute table 42 has an entry 421 for a device identifier, and an entry 422 for the time accumulated by the message on its path via neighbouring devices to a target device. In this example, device D1 has sent a traceroute message to device D7. Each intermediate device enters a timestamp into the message. The completed message is returned to D1, which can then compile its traceroute table 42. In this example, the traceroute message took 0.3 ms to reach device D4, 0.6 ms to reach device D5, 0.9 ms to reach device D6, and 1.2 ms to reach device D7 before being returned to device D1. From this traceroute table 40, the network topology discovery unit can conclude that device D4 is closest to device D1, device D5 is next closest, etc.

Device D8 has compiled a ping table 43. Each row of the ping table 43 has an entry 431 for a device identifier, and an entry 432 for the time taken by the ping message to return to device D8. For the sake of simplicity, only two completed rows are shown. In this example, a ping message with device D5 as target took 0.9 ms to return from device D5. A ping message with device D1 as target took 1.2 ms to return from device D1. The ping table 43 therefore can give an indication of the relative 'distances' between devices. Knowing that a forwarding delay comprises about 0.1 ms, the network topology discovery unit can deduce that, from the point of view of device D8, device D1 is further along a branch of the network than device D5. Of course, a ping table 43 delivers less immediately useful information than a connectivity table 40 or a forwarding table 41, but can still be used to determine the position in the network of a device that its only IP-addressable and which itself cannot compile network descriptive information.

Figure 6:
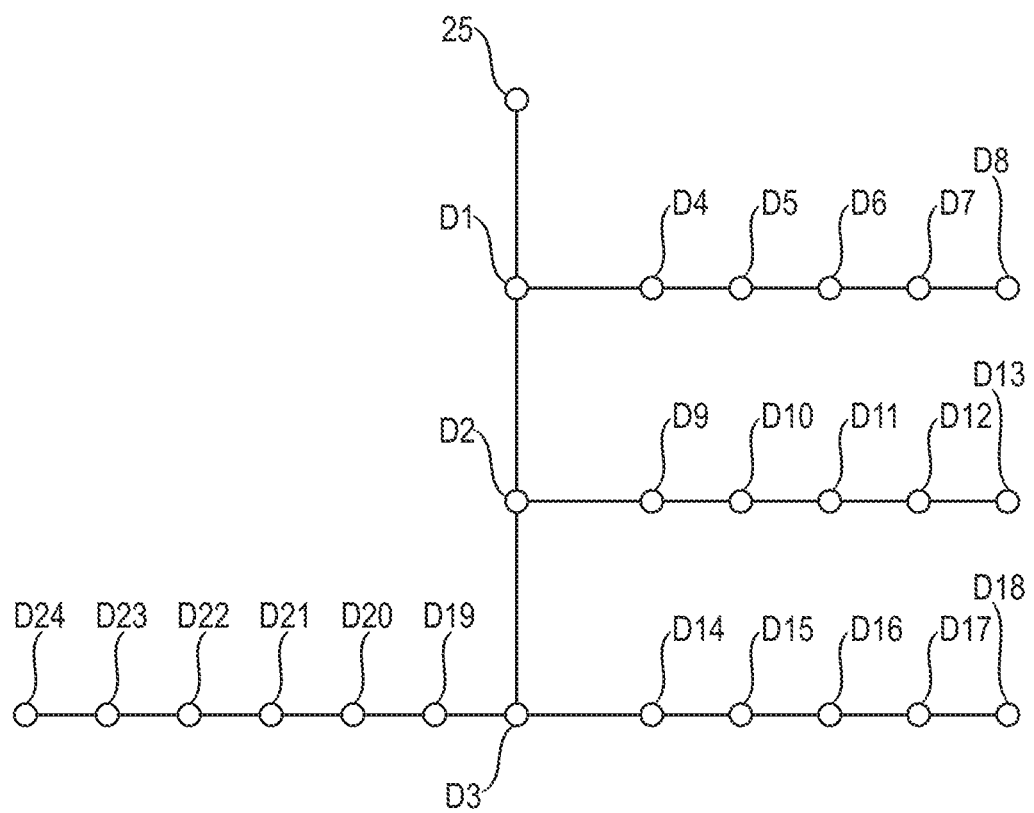
FIG. 6 is a schematic representation the network of FIG. 3 after network discovery.
Figure 7:
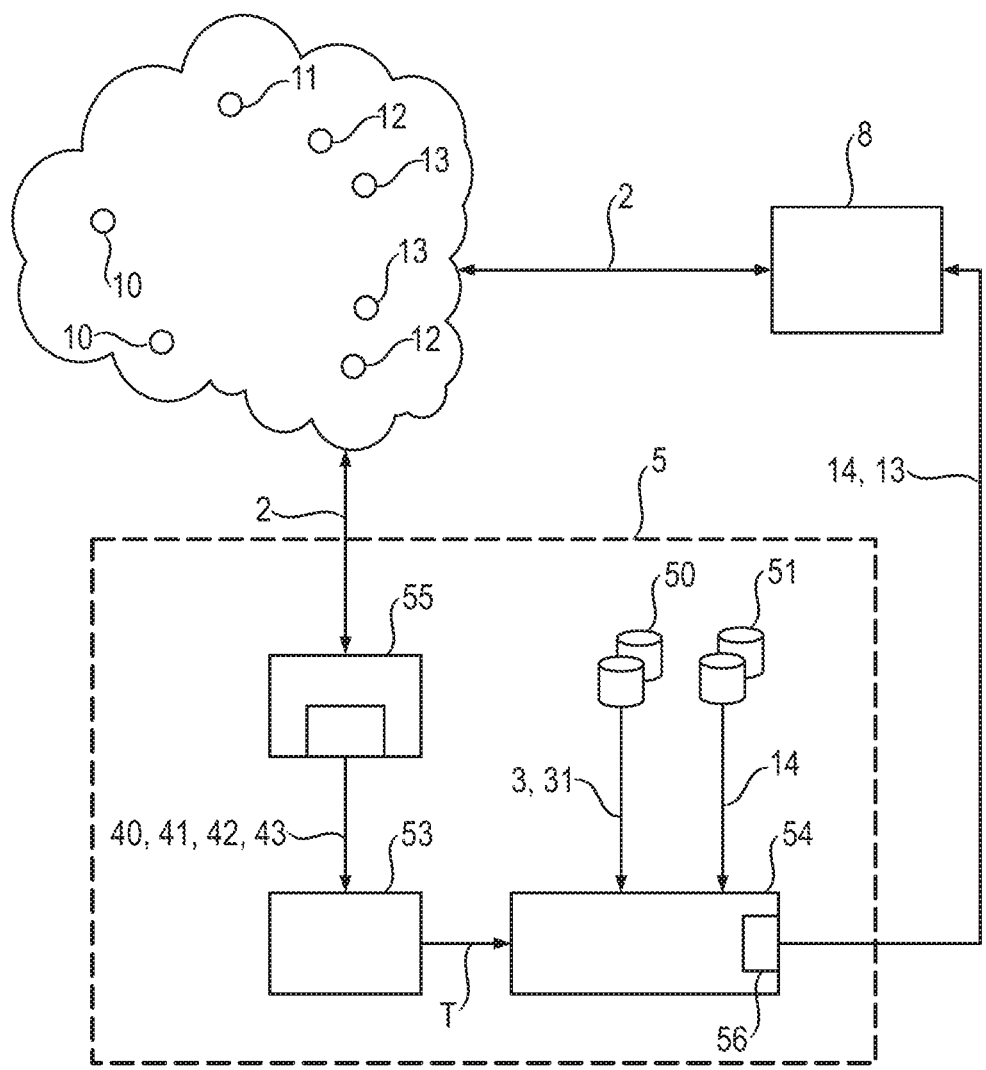
FIG. 7 is a block diagram of a commissioning system according to an embodiment of the invention.

FIG. 6 shows the network of FIG. 3 after network discovery has been performed using the network descriptive information 40, 41, 42, 43 collected by the devices D1-D25. Such a discovered topology can then be put to use by a commissioning system 5 according to the invention, as shown the block diagram of FIG. 7. The commissioning system 5 comprises a memory 50 for storing a computer-readable installation plan 3, which includes physical location descriptors 31 of each wired device of the network N. Of course, the installation plan can be provided over any suitable source 50, for example it may be stored on a CD or DVD inserted into a drive of a computer. A device control interface 55 is realised to assemble messages or frames to be sent via a root bridge of the network N to other devices 10, 11, 12, 13 in the network, so that any message 2 can be routed to a specific target device 10, 11, 12, 13 or broadcast to all devices 10, 11, 12, 13 of the network N. To initiate network discovery, the device control interface 55 can cause the devices 10, 11, 12, 13 of the network N to exchange messages 2, for example BPDU messages 2, traceroute messages 2, ping messages 2 etc. Once these messages 2 have been exchanged by the devices 10, 11, 12, 13, the device control interface 55 can cause the devices 10, 11, 12, 13 to return their compiled network descriptive information 40, 41, 42, 43, which is extracted from the returned messages 2 by a data input unit 51. A topology discovery unit 53 analyses the network descriptive information 40, 41, 42, 43 to determine the network topology T. A commissioning unit 54 compares the discovered network topology T to the installation plan 3 and determines which physical location descriptor 31 is associated with a particular device identifier 14. For example, using FIG. 1, FIG. 2 and FIG. 6, the commissioning unit 54 can deduce that the devices D19-D24 are the six lights of the larger room of FIG. 1, and that device D24 is the terminating device of the daisy chain, with physical location descriptor "2.6.5". Similarly, it can easily be deduced that device D1 is directly connected to the root bridge D25. Physical location descriptor/device identifier pairs can then be output over a suitable control system interface 56 to a control system 8, for example a lighting control system 8, which can use the information to control devices of the network individually, in groups, or collectively, according to a user's requirements.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art from a study of the drawings, the disclosure, and the appended claims. For example, although the method according to the invention is ideally suited to performing commissioning for a wired network, some wireless devices could also be considered, for example a short-range wireless device whose position in the network can be deduced from messages exchanged between it and another wired device.

For the sake of clarity, it is to be understood that the use of 'a' or 'an' throughout this application does not exclude a plurality, and 'comprising' does not exclude other steps or elements. The mere fact that certain measures are recited in mutually different dependent claims does not indicate that a combination of these measures cannot be used to advantage. Any reference signs in the claims should not be construed as limiting the scope.

The invention claimed is:

1. A method of performing automatic commissioning of a network comprising a plurality of network devices for lighting a building, wherein the devices are realised to exchange data packets, which method comprises the steps of:
    receiving an installation plan for the network, which installation plan comprises a physical location descriptor for devices of the network, wherein each device is characterised by a device identifier;
    issuing broadcast commends for a predetermine time to each device to broadcast data packets to other devices;
    accumulating, during the predetermine time by each device, network descriptive information based on communication information related to data packets exchanged between the devices, wherein the network descriptive information identifies neighboring devices for each device of the network and includes one or more of a list of sending/receiving device port identifiers, forwarding tables, connectivity tables, traceroute time results, and ping time results;
    analysing the accumulated network descriptive information from each device to deduce a network topology of the entire network by estimating distances between each device using the network descriptive information;
    allocating a physical location descriptor to each device identifier in the network topology by comparing the network topology to the installation plan, by pairing a device identifier with a physical location descriptor by deduction;
    grouping devices based on their physical locations or function,
    commissioning the network by providing the device identifiers, physical location descriptors and groups to a control system to control a device.

2. The method according to claim 1, wherein the network descriptive information accumulated by a device comprises an elapsed time between an instant at which a data packet was sent from a sending device and an instant at which the data packet was received by that device.

3. The method according to claim 1, wherein a data packet is received and consumed by only one receiving device.

4. The method according to claim 3, wherein the receiving device is an immediate neighbour of the sending device.

5. A commissioning system for automatically commissioning a network comprising a plurality of wired network devices for lighting and climate control of a building, wherein the devices are realised to exchange data packets, which commissioning system comprises:
    a memory to receive a computer-readable installation plan for the network, which installation plan comprises a physical location descriptor for each device of the network, wherein each device is characterised by a device identifier and wherein the plurality of network devices includes at least two or more of a light or luminaire, light switch, light sensor and thermostat;
    a device control interface to issue broadcast commends for a predetermine time to each device to broadcast data packets to other devices, accumulate network descriptive information provided by each of the devices, wherein the network descriptive information is based on communication information related to data packets exchanged between the devices, and wherein the network descriptive information identifies neighboring devices for each device of the network and includes one or more of a list of sending/receiving device port identifiers, forwarding tables, connectivity tables, traceroute time results, and ping time results;
    a topology discovery unit to derive the network topology of the entire network from the provided network descriptive information-by estimating distances between each device using the network descriptive information; and
    a commissioning unit to allocate a physical location descriptor to each device identifier in the network topology, wherein the commissioning unit compares the derived network topology to the installation plan by pairing a device identifier with a physical location descriptor by deduction and groups devices based on their physical locations or function.

6. The commissioning system according to claim 5, wherein the device control interface is realised to control the devices of the network to exchange data packets.

7. The commissioning system according to claim 6, wherein the device control interface is realised to control devices of a wired network.

8. The commissioning system according to claim 5, wherein the device control interface is realised to control a device comprising a bridge router and/or to control a device comprising an Internet Protocol router.

9. The commissioning system according to claim 5, comprising a control system interface for supplying a device identifier and the physical location descriptor of the device associated with that device identifier to a control system.

10. A computer program product, fixed in a tangible medium, when run on a processor of a programmable commissioning system for a method of performing automatic commissioning of a network comprising a plurality of network devices for lighting a building, wherein the devices are realised to exchange data packets, the computer program product comprises code for:
    receiving an installation plan for the network, which installation plan comprises a physical location descriptor for devices of the network, wherein each device is characterised by a device identifier;
    issuing broadcast commends for a predetermine time to each device to broadcast data packets to other devices;
    accumulating, during the predetermine time by each device, network descriptive information based on communication information related to data packets exchanged between the devices, wherein the network descriptive information identifies neighboring devices for each device of the network and includes one or more of a list of sending/receiving device port identifiers, forwarding tables, connectivity tables, traceroute time results, and ping time results;
    analysing the accumulated network descriptive information from each device to deduce a network topology of the entire network by estimating distances between each device using the network descriptive information;
    allocating a physical location descriptor to each device identifier in the network topology by comparing the network topology to the installation plan, by pairing a device identifier with a physical location descriptor by deduction;
    grouping devices based on their physical locations or function, and commissioning the network by providing the device identifiers, physical location descriptors and groups to a control system to control a device.

11. The method according to claim 1, wherein the one or more communication information tables for each device includes one or more of: a connectivity table, a forwarding table, a traceroute table, and a ping table.

12. The method according to claim 1, wherein the network descriptive information is accumulated by the devices of the network based on data packets exchanged by the devices.

13. The method according to claim 12, wherein the network descriptive information accumulated by a receiving device comprises a list of device identifiers, wherein each device identifier of the list indicates the device that sent a data packet received by that receiving device.

14. The method according to claim 13, wherein the network descriptive information accumulated by a receiving device comprises a list of port identifiers, wherein each port identifier of the list indicates the port from which a device sent a data packet received by that receiving device.

15. The method according to claim 1, wherein the control system is a digital addressable lighting interface (DALI) system.

16. The method according to claim 1, wherein the commissioning step includes,
   grouping the devices in a portion of the building according to their physical locations, and
   controlling the devices using the device identifiers based on the group.

17. The method according to claim 1, wherein the issuing broadcast commends includes issuing a Bridging Protocol Data Unit (BPDU) packet based on IEEE MAC bridges standard (IEEE 802.1D) standard.

18. The method according to claim 1, wherein network descriptive information identifies neighbouring devices for each device of the network by tracking a time a broadcast message takes be returned to an originating device from a target device, wherein the time taken for the broadcast message to pass from one IP router to another on its way to the target device is tracked, wherein the broadcast message is forwarded by each IP router until it reaches the target device, wherein each device along a path enters a timestamp into the broadcast message body, wherein when the target device is reached, the target device enters a timestamp and returns a traceroute command back to the originating device, originating device extracts the timestamp information, and wherein if the target device is not reached, a timeout occurs and returned to the originating device, and wherein the network descriptive information includes an elapsed time for each IP router reached by the broadcast message.

19. The method according to claim 1, wherein network descriptive information identifies neighbouring devices for each device of the network by having device comprise a list of port identifiers, wherein each port identifier of the compiled list indicates a port from which a sending device sent a broadcast message received by a receiving device, wherein, for each port number of a receiving device, the receiving device lists a device identifier of an originating device that sent a message received at that port, as well as a port number of a port from which the sending device sent the message.

* * * * *